United States Patent [19]

Phelps

[11] 4,178,518
[45] Dec. 11, 1979

[54] ELECTRONIC DIRECTIONAL CONTROL CIRCUIT

[75] Inventor: Weldon L. Phelps, Dunlap, Ill.

[73] Assignee: Caterpillar Tractor Co., Peoria, Ill.

[21] Appl. No.: 920,587

[22] Filed: Jun. 29, 1978

[51] Int. Cl.² .......................................... B60K 31/00
[52] U.S. Cl. ..................................... 307/9; 180/77 R;
                              318/10; 318/285; 74/866
[58] Field of Search ................ 180/65 R, 77 R, 77 D,
       180/77 H; 307/9; 318/257, 285, 10, 4; 74/866;
                                              361/191, 193

[56] References Cited

U.S. PATENT DOCUMENTS

| | | | |
|---|---|---|---|
| 2,968,967 | 1/1961 | Ross | 180/77 R |
| 3,805,640 | 4/1974 | Schneider et al. | 74/866 X |

Primary Examiner—L. T. Hix
Assistant Examiner—James L. Dwyer
Attorney, Agent, or Firm—John L. James

[57] ABSTRACT

Lift trucks (10) have many hand control levers which are manipulated to hoist a load, propel the lift truck (10) forward and rearward, and steer the lift truck (10). Some operations must be performed sequentially rather than simultaneously which increases loading time. An electronic directional control circuit (34) includes apparatus (36) for producing first and second command signals, apparatus (38) for producing first and second outputs in response to the first and second command signals, and apparatus (40) for delaying production of a preselected one of the first and second outputs a preselected time sufficient for the selected output to decrease to a preselected magnitude prior to the production of the other of the first and second outputs. The electronic directional control circuit (34) is useable with vehicles (10) which initiate the command signals with a foot operated pedal (12) while leaving the hands free for simultaneously operating other controls.

9 Claims, 5 Drawing Figures

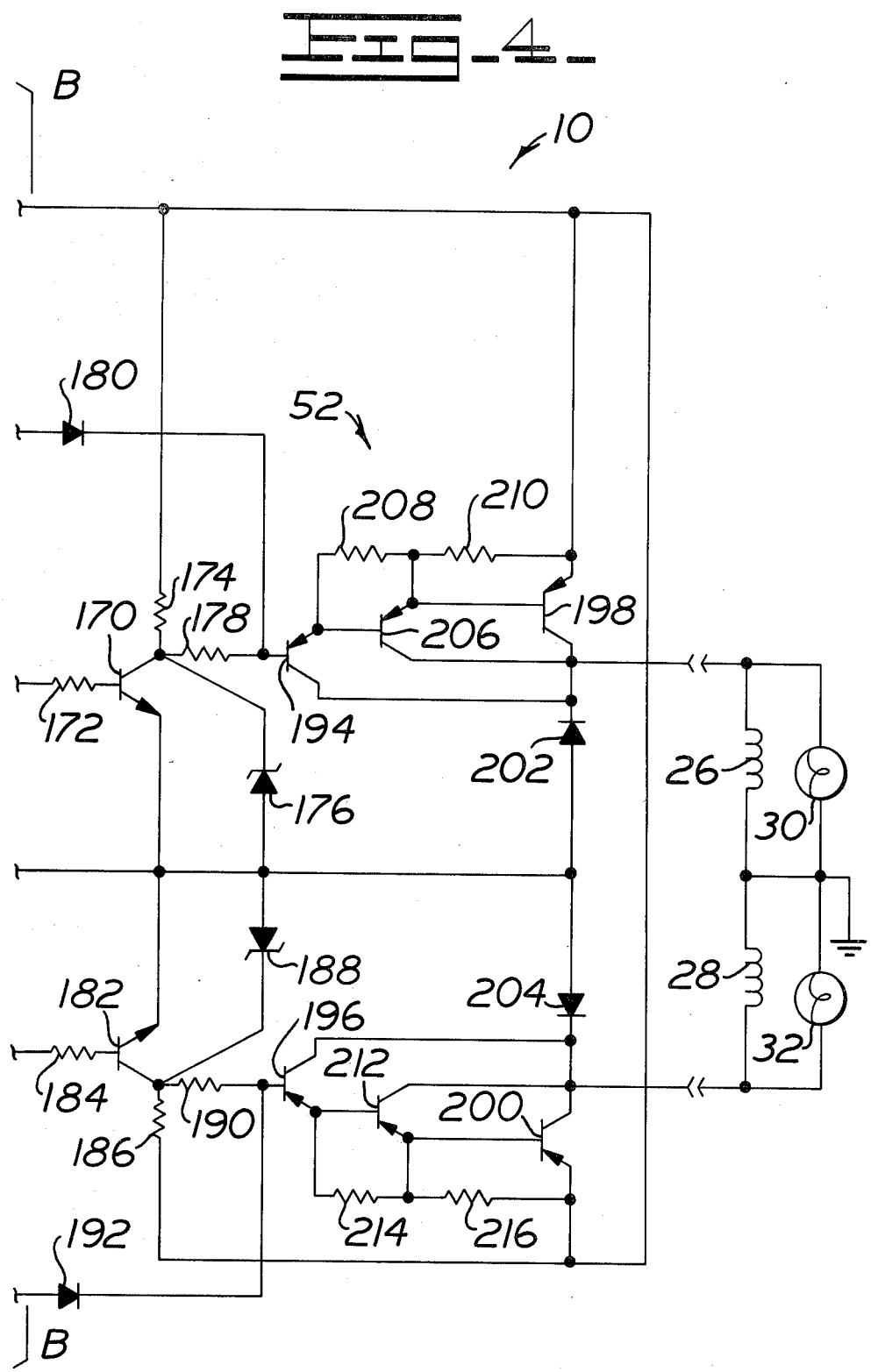
FIG_4

ELECTRONIC DIRECTIONAL CONTROL CIRCUIT

Technical Field

This invention relates to an electronic circuit for effecting directional control of a vehicle.

BACKGROUND ART

The operator of a vehicle, particularly a lift truck, is required to manipulate one or more hand control levers for hoisting a load and tilting the mast of the truck and is also required to steer the vehicle. Since the operator must also manipulate hand control levers to propel the vehicle in the forward and reverse directions, it is evident that some operations must be performed sequentially rather than simultaneously. Such operation increases loading time and reduces productivity.

An attempt at providing simultaneous control is disclosed in U.S. Pat. No. 2,968,967 granted on Jan. 24, 1961 to Cecil J. Ross Jr. in which a foot control lever controls the forward and reverse motion of the vehicle. By using a foot pedal to change directions, the hands are free for steering and manipulating the load. However, the pedal is always in one of the forward and reverse directions even when the foot is removed from the pedal. It is possible to depress both the forward and reverse switches simultaneously with the result that the operator does not know the direction in which the vehicle will travel.

It is desirable to have a directional control which returns to neutral when both the forward and reverse switches are activated at the same time. It is also desirable to have a single directional control which is useable with internal combustion engine vehicles and with electric vehicles.

Solenoids are typically used to shift valves and move levers to control vehicle direction. Where the lever moves in two directions, two solenoids are used, one to move the lever in each direction. Since solenoids remain energized for a period of time after the power source is removed, the solenoid must have time to deenergize before the second solenoid is energized so that the lever can move. It is desirable to have a control circuit which directs current through each solenoid in a selected direction and which delays operation of one solenoid until the other has deenergized.

In vehicles, such as lift trucks which have inductive motors, there are transient voltages of greater magnitude than the nominal rated voltages of the vehicle systems which are often great enough to damage the solenoids or other circuit components. It is desirable to provide transient and overcurrent protection for the solenoids and other circuit components.

Current internal combustion engine lift trucks use a stick selector for choosing the forward or reverse direction of travel while electric lift trucks use a dash mounted electrical switch. It is desirable to have a foot actuated directional control circuit which is useable with electric and internal combustion engine lift trucks.

DISCLOSURE OF THE INVENTION

In one aspect of the invention, an electronic directional control circuit comprises means for producing first and second command signals, means for producing first and second outputs in response to the first and second command signals, and means for delaying production of a preselected one of the first and second outputs a preselected time sufficient for the selected output to decrease to a preselected magnitude prior to the production of the other of the first and second outputs.

One output is delayed until the other output falls to a preselected value. The circuit is useable with electric vehicles and internal combustion engine vehicles which can initiate the command signals with a foot pedal while leaving the hands free to simultaneously operate other controls.

BRIEF DESCRIPTION OF THE DRAWINGS

FIG. 4 is a portion of the electronic circuit generally represented by the right hand group of blocks 52 and 54 in FIG. 1 and is connected to FIG. 3 along line B—B; and FIG. 5 is a block diagram showing the connection of individual circuit components.

BEST MODE FOR CARRYING OUT THE INVENTION

Figure 2:
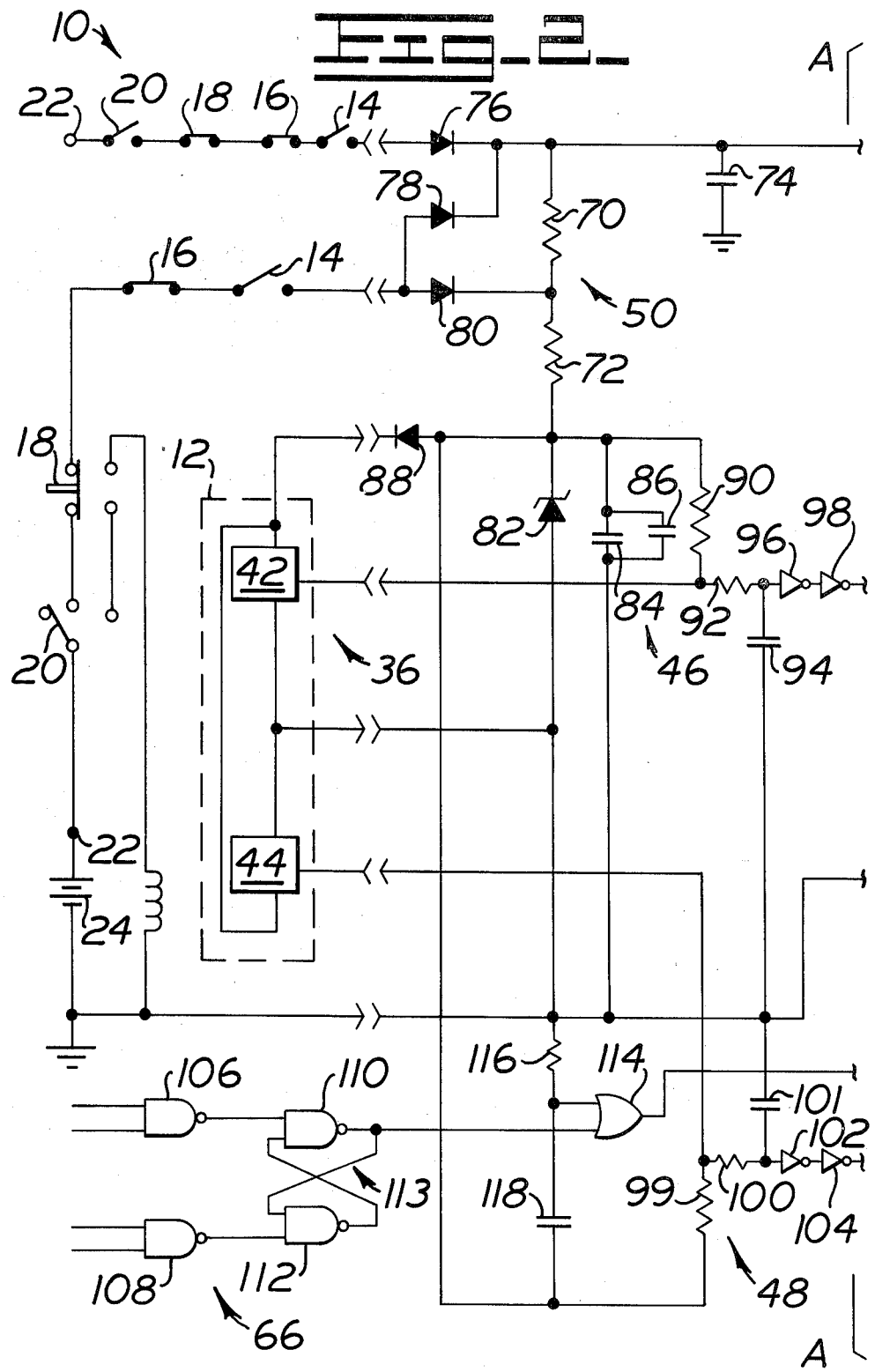
FIG. 2 is a portion of the electronic circuit generally represented by the left hand group of blocks, 42,44,46,48,50 and 66, in FIG. 1 and is connected to FIG. 3 along line A—A.

Referring to FIG. 2, a vehicle, such as an electric or internal combustion engine lift truck 10, for example, has a foot operated control lever, such as foot pedal 12. The lift truck 10 has a seat switch 14, a neutral switch 16, a parking brake switch 18 and an ignition switch 20 all connected in series as is known in the art. The switches 14,16,18, and 20 are connected at point 22 to the power supply 24 which is nominally a 9 Vdc to 16 Vdc battery in the case of an internal combustion engine lift truck and 18 Vdc to 50 Vdc in the case of an electric lift truck.

Referring to FIG. 4, the lift truck 10 contains forward and reverse solenoids 26,28 which operate a valve or other device which causes the lift truck 10 to travel in the forward and reverse directions, respectively. A forward indicating lamp 30 is connected in parallel with the forward solenoid 28 and a reverse indicating lamp 32 connected in parallel with the reverse solenoid 28.

Figure 1:
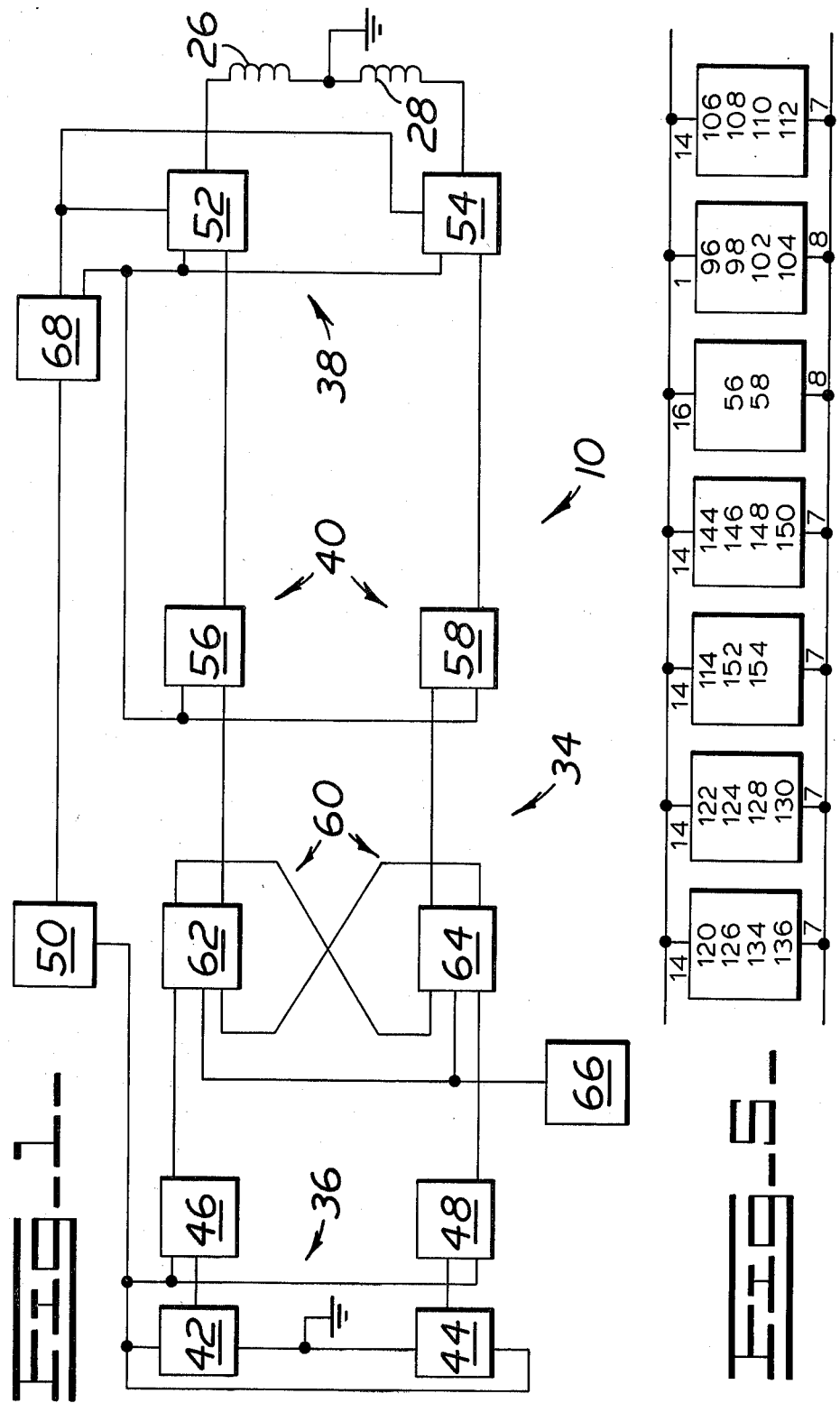
FIG. 1 is a block diagram of an embodiment of the present invention.

Referring generally to FIG. 1; an electronic directional control circuit 34 includes: input means 36 for producing first and second command signals; output means 38 for producing a first output of preselected polarity and magnitude in response to the input means 36 producing the first command signal and a second output of preselected magnitude and polarity in response to the input means 36 producing the second command signal; and delay means 40 for delaying operation of the output means 38 and production of the first and second outputs a preselected time sufficient for the first output to decrease to a preselected magnitude prior to the production of the second output and for the second output to decrease to a preselected magnitude prior to the production of the first output.

The input means 36 basically comprises a first, forward switch 42, and a second reverse switch 44 each of which is preferably a Hall effect switch. Forward and reverse pulse shapers 46,48 are connected to the forward and reverse switches 42,44, respectively. A voltage distributing network 50 is connected to the switches 42,44 and pulse shapers 46,48 and coupled to the output means 38.

The output means 38 basically comprises forward and reverse multi-stage transistor drivers 52 and 54 and the delay means 40 basically comprises forward and reverse time delay counters 56,58.

The circuit 34 also includes storage means 60 for receiving the first and second directional command signals and remembering which one of the command signals has been received during operation of the circuit 34. The memory means 60 basically comprises forward and reverse flip-flops 62,64 connected one to the other.

As seen in FIG. 1, the circuit is physically and functionally symmetrical with forward elements 42,46,62,56,52 and 26 being the mirror image of reverse elements 44,48,64,58,54 and 28 with the voltage distributing network 50, a neutralizing means 66 and a detecting means 68 being common to both the forward elements and reverse elements.

The neutralizing means 66 receives the first and second command signals and prevents operation of the output means 38 and production of the first and second outputs in response to receiving both the forward and reverse command signals.

The detecting means 68 detects the magnitude of the first and second outputs and prevents operation of the output means 38 when the magnitude of either output exceeds a preselected value. The detecting means 68 is connected to the delay means 40 and prevents operation of the output means 38 for a preselected time interval measured from the moment the magnitude first exceeds the preselected value, and at equal intervals thereafter as long as the magnitude exceeds the preselected value.

Referring more specifically to FIG. 2, the voltage distributing network 50 includes first and second resistors 70,72 connected one to the other in series. A capacitor 74 is connected to the first end of the first resistor 70 and to ground. A first diode 76 has its cathode connected to the resistor 70 and capacitor 74 and a second diode 78 has its cathode connected to the cathode of the first diode 76. A third diode 80 has its anode connected to the anode of the second diode 78 and its cathode connected between the first and second resistors 70,72 to the second end of the first resistor 70 and first end of the second resistor 72. A zener diode 82 has its cathode connected to the second end of the second resistor 72 and its anode connected to ground. Capacitors 84 and 86 are each connected in parallel with the Zener diode 82. A diode 88 has its anode connected to the second end of the resistor 72.

One input terminal of each of the hall effect switches 42,44 is connected to the cathode of the diode 88 and the other terminal is connected to the anode of the zener diode 82. The outputs of the forward and reverse hall effect switches are the forward and reverse command signals.

The forward pulse shaper 46 includes first and second resistors 90,92 and a capacitor 94. The first end of the resistor 90 is connected to the second end of resistor 72 and the second end is connected to the first end of resistor 92. The capacitor 94 is connected to the second end of resistor 92 and to ground. The forward command signal is received at the junction of the resistors 90 and 92. First and second inverters 96,98 are connected in series with their input connected at the junction of the resistor 92 and capacitor 94.

The reverse pulse shaper 48 has resistors 99,100, capacitor 101, and inverters 102,104 substantially identical to the corresponding elements in the forward pulse shaper 46. Of course, the reverse command signal is received at the junction of the resistors 99 and 100 instead of the forward command signal.

The neutralizing means 66 includes four, two-input NAND gates, 106,108,110,112, an OR gate 114, a resistor 116, and a capacitor 118. The inputs of gate 106 are preferably connected to the outputs of inverters 96 and 102 and the inputs of gate 108 are preferably connected to the outputs of inverters 98 and 104. The output of gate 106 is connected to one input of gate 110 and the output of gate 108 is connected to one input of gate 112. The output of gate 112 is connected to the other input of gate 110. The output of gate 110 is connected to the other input of gate 112 and to one input of the OR gate 114. In this way gates 110 and 112 form a flip-flop 113. One end of the resistor 116 and capacitor 118 are connected to the other input of the OR gate 114. The other end of the resistor 116 is grounded and the other end of the capacitor 118 is connected to the second end of resistor 72.

Figure 3:
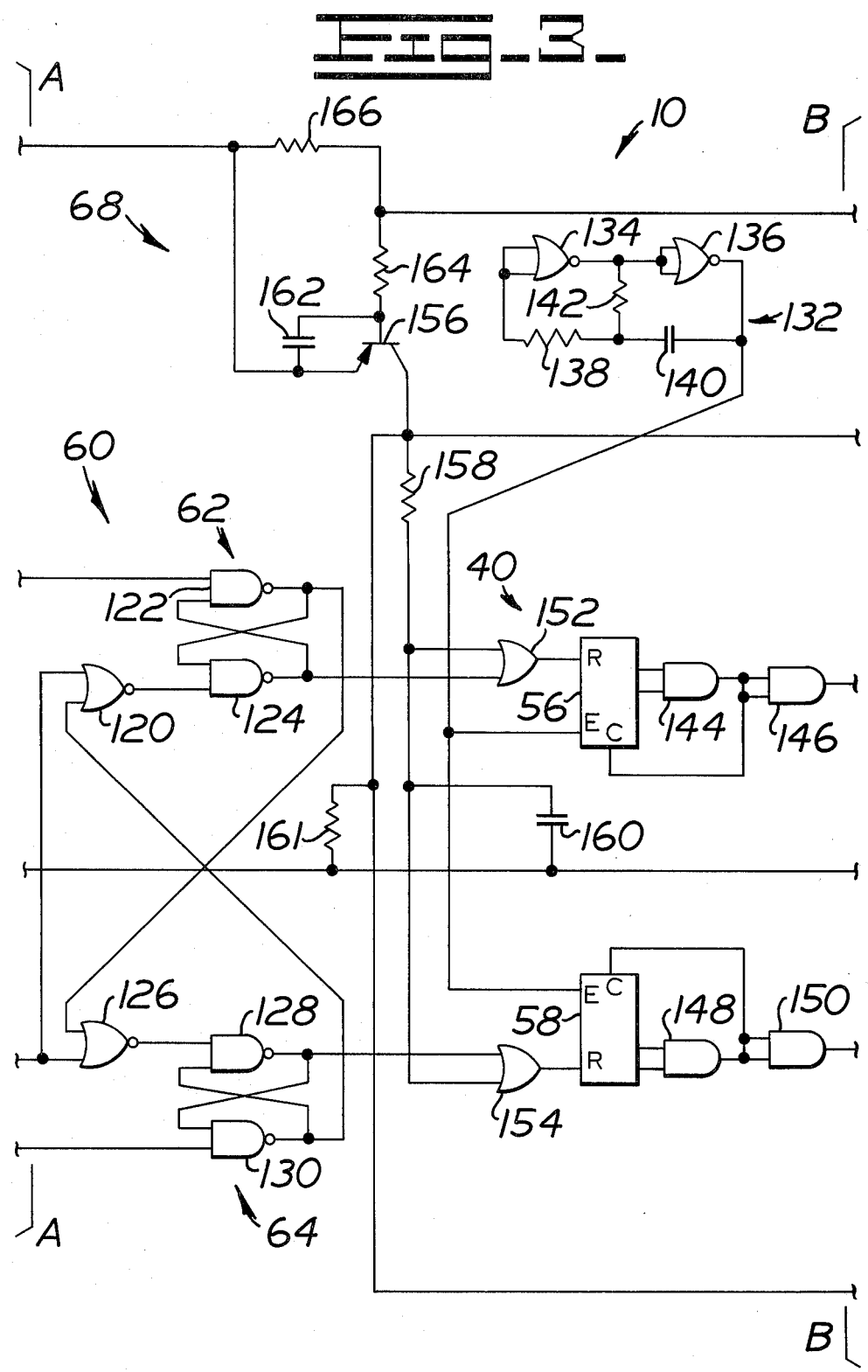
FIG. 3 is a portion of the electronic circuit generally represented by the middle group of blocks 56,58,62,64 and 68, in FIG. 1 and is connected to FIG. 2 along line A—A and FIG. 4 along line B—B.

Referring to FIG. 3, the forward memory means 60 includes a NOR gate 120 and the forward flip-flop 62 which includes NAND gates 122 and 124. One input of gate 122 is connected to the output of the inverter 98 and the other input is connected to the output of gate 124. One input of gate 124 is connected to the output of gate 122 and the other input is connected to the output of NOR gate 120. One input or NOR gate 120 is connected to the output of OR gate 114.

The reverse memory means 64 includes a NOR gate 126 and the reverse flip-flop 64 which includes NAND gates 128 and 130. One input of gate 130 is connected to the output of the inverter 104 and the other input is connected to the output of gate 128. The output of gate 130 is connected to the other input of gate 120. One input of gate 128 is connected to the output of gate 130 and the other input is connected to the output of NOR gate 126. One input of NOR gate 126 is connected to the output of OR gate 114 and the other input is connected to the output of gate 122.

Referring to FIG. 3, the delay means 40 includes the forward and reverse counters 56,58 and a clock 132. The clock 132 includes NOR gates 134 and 136 which are connected in series and a resistor 138 and a capacitor 140 connected in series one with the other and connected in parallel with the NOR gates 134,136. A resistor 142 is connected at one end to the output of gate 134 and input of gate 136 and connected at the other end between the resistor 138 and capacitor 140.

The outputs of the clock 132 are connected to the enable terminal of each counter 56,58. The output of forward counter 56 are connected to serially connected AND gates 144 and 146. The output of gate 144 is connected to the clock input of counter 56. The outputs of the reverse counter 58 are connected to serially connected AND gates 148 and 150. The output of gate 148 is connected to the clock input of counter 58.

The reset terminal of counter 56 is connected to the output of an OR gate 152 which has one of its inputs connected to the output of NAND gate 124 in the forward flip-flop 62. Similarly, the reset terminal of counter 58 is connected to the output of an OR gate 154 which has one of its inputs connected to the output of NAND gate 128 in the reverse flip-flop 64.

The detecting means 68 includes a transistor 156 which has its emitter connected to the first end of the first resistor 70 of the voltage distributing network 50. A resistor 158 has one end connected to the transistor collector and the other end connected to the OR gates 152 and 154 and to a capacitor 160. The other end of the capacitor 160 is grounded. A resistor 161 is connected to the transistor collector and is grounded essentially making the transistor configuration a grounded collector.

A capacitor 162 is connected across the emitter and base of the transistor 156. Resistors 164 and 166 are connected one to the other in series and in parallel with the capacitor 162.

Referring to FIG. 4, a forward transistor 170 couples the counter 56 to the forward transistor driver 52. A resistor 172 connects the output of AND gate 146 to the base of the transistor 170. The emitter of transistor 170 is grounded and a resistor 174 connects the collector to the junction of resistors 164 and 166 of the detecting means 68. A zener diode 176 has its cathode connected to the transistor collector and has its anode connected to ground.

A resistor 178 is connected at one end to the transistor collector and at the other end to the forward driver 52 and cathode of a diode 180. The anode of the diode 180 is connected to the collector of transistor 156.

A reverse transistor 182 couples counter 58 to the reverse transistor driver 54. A resistor 184 connects AND gate 150 to the base of transistor 182. The emitter of transistor 182 is grounded and a resistor 186 connects the collector to the junction of resistors 164 and 166. A zener diode 188 has its anode grounded and its cathode connected to the transistor collector.

A resistor 190 is connected at one end to the collector of transistor 182 and at the other end to the reverse driver 54 and cathode of a diode 192. The anode of diode 192 is connected to the collector of transistor 156.

Referring to FIG. 4, the forward and reverse transistor drivers 52,54 contain input transistors 194,196 which have their bases connected to resistors 178,190 and output transistors 198,200, respectively, which have their emitters connected to the junction of resistors 164 and 166. The collectors of transistors 194 and 198 are connected to the cathode of diode 202, forward solenoid 26 and lamp 30. The anode of diode 202 is connected to ground and anode of diode 204 which has its cathode connected to the collectors of transistors 196 and 200 and to the reverse solenoid 28 and lamp 32.

A transistor 206 is connected between transistors 194 and 198 with its base connected to the emitter of transistor 194, its emitter connected to the base of transistor 198, and its collector connected to both collectors. A resistor 208 is connected between the emitters of transistors 194 and 206 and resistor 210 is connected to the emitters of transistors 198 and 206.

A transistor 212 is connected between transistors 196 and 200 with its base connected to the emitter of transistor 196, its emitter connected to the base of transistor 200, and its collector connected to both collectors. A resistor 214 is connected between the emitters of transistors 196 and 212 and resistor 216 is connected to the emitters of transistors 200 and 212.

Referring to FIGS. 1-4, the electronic directional control circuit 34 is constructed using seven integrated circuits which are connected to the second end of resistor 72 of the voltage distribution network 50. In a preferred embodiment the components of the circuit were as follows:

| Element | Reference Number | Model No. |
| --- | --- | --- |
| Hall effect switch | 42,44 | 55 SS16 each |
| AND gate | 144,146,148,150 | ¼ each 4081B |
| NAND gate | 106,108,110,112, 122,124,128,130 | ¼ each 4011B |
| OR gate | 114,152,154 | ¼ each 4071B |
| NOR gate | 120,126,134,136 | ¼ each 4001B |
| Inverter | 96,98,102,104 | 1/6 each 4049B |
| diode | 80,88,180,192 | each 1N4004 |
| diode | 76,78 | each MR754 |
| diode | 202,204 | each MR504 |
| diode | 176,188 | each 1N4764 |
| diode | 82 | 1N4734A |
| transistor | 170,182 | 2N5831 |
| transistor | 194,196,206,212 | 2N6476 |
| transistor | 198,200 | 2N6230 |
| Element | Reference Number | Value |
| Coil | 26,28 | 12-volt 5.5ohm @25° C. |
| lamp | 30,32 | 12-volt |
| capacitor | 74,160,162 | 0.001μf |
| capacitor | 86 | 0.01 μf |
| capacitor | 94,101,118,140 | 0.1 μf |
| capacitor | 84 | 47 μf |
| Resistor | Ohms | Watts |
| 166 | 0.1 | 3¼ |
| 72 | 150 | 3 |
| 208,214 | each 300 | ½ |
| 70 | 450 | 5 |
| 161 | 910 | ½ |
| 178,190 | each 1.2K | 3 |
| ¼ Watt Resistors | Ohms | |
| 210,216 | 51 | |
| 164,172,184 | each 510 | |
| 90,99 | each 1K | |
| 174,186 | each 10K | |
| 92,100,158 | eacch 20K | |
| 142 | 47K | |
| 138 | 200K | |
| 116 | 1M | |

INDUSTRIAL APPLICABILITY

In one industrial application, the lift truck 10 is an internal combustion engine lift truck which has a 9 to 16 Vdc battery or power supply connected to point 22 of the circuit 34 and the coils 26 and 28 are solenoid valve coils. The negative terminal of the battery is grounded and the positive terminal delivers power to diodes 78 and 80 through switches 14,16,18 and 20. Power flow is interrupted when the seat switch 14 opens in response to the operator leaving the seat, when the neutral switch 16 is opened, when the parking brake is on after the lift truck 10 is started opening switch 18 or when the ignition switch 20 is turned off.

When the switches 14,16,18,20 are closed, positive battery potential is delivered through diodes 78 and 80 to the first and second ends of resistor 70. Consequently, no current will flow through resistor 70. This potential breaks down diode 82 establishing approximately a 5.6 Vdc voltage drop across diode 82 and establishing approximately a 5 Vdc potential at the second end of resistor 72. Current now flows through resistor 72 readying the Hall effect switches 42,44 for operation. Current flows through resistors 90,92 and 99,100 charging capacitors 94 and 101, respectively, and current also flows through capacitors 84 and 86 charging them. When all the capacitors 84,86,94 and 101 are fully charged, the voltage applied to the inverters 96,102 is approximately 5 Vdc. Capacitors 86,94,101 and 160 help suppress noise.

Capacitor 74 also charges and resists any further change in the potential at the first end of resistor 72 thereby acting as a filter.

Current flows through capacitor 118 and resistor 116 charging capacitor 118 to approximately 5 Vdc.

Thus, as soon as the switches 14,16,18 and 20 are closed, the input to inverters 96 and 102 changes from a low of about 0 Vdc to a high of about 5 Vdc. The input to OR gate 114 was initially low but went high when capacitor 118 was charging and went low again when capacitor 118 was charged. Thus, neither the forward coil 26 nor the reverse coil 28 is energized when the power is first turned on and the lift truck 10 does not move.

When the switches 14,16,18, and 20 are first closed, positive battery is applied to resistor 166 and capacitor 162 which charges the capacitor 162 and biases transistor 156. Power is delivered through resistor 166 to transistors 198 and 200 and to transistors 170,182,194, 196,206 and, 212 so that the voltage across resistor 166 is a function of current requirements of these transistors. When the current demanded by these transistors exceeds a preselected value, the voltage across resistor 166 exceeds the emitter to base voltage and turns on the transistor 156.

When transistor 156 turns on, diodes 180 and 192 conduct delivering a signal to the bases of transistors 194 and 196 which turns off transistors 194,206,198 and 196,212,200, respectively. Current also travels through resistor 158 charging capacitor 160 and delivering a high input to OR gates 152 and 154 which resets the counters 56 and 58, respectively and turns off the forward and reverse drivers 52,54. This removes the short circuit condition allowing the counters to resume counting and turns on the drivers after a preselected time.

Each counter 56,58 receives pulses from the 100 HZ clock 132 at its enable terminals. The output appears 12 counts or approximately 120 ms after the input pulse resets the counter to zero or any other preselected time depending on the counter used. The output of counter 56 goes to AND gate 144 whose output goes to AND gate 146 and to the clock terminal of the counter 56. The output of counter 58 goes to AND gate 148 whose output goes to AND gate 150 and to the clock terminal of counter 58. By this construction, each counter 56,58 produces an output 120 ms after its respective input signal is received at the reset terminal and the outputs of AND gates 146,150 turn on transistors 170 and 182 which energize the coils 26,28. Leading pulse edges are counted at terminal "C" which latches the counter and lagging edges at terminal "E".

The frequency of the clock 132 can be varied by varying the value of resistor 142. A frequency of 100 HZ, for example, is obtained when the value of resistor 142 is about 47 K while a frequency of 50 HZ is obtained with a value of about 100 K. The frequency will, of course, change the duration of the time delay for a given count. At a frequency of 100 HZ, 12 counts equals approximately 120 milli-seconds while 12 counts at 50 HZ is about 240 milli-seconds.

Referring to FIG. 2, when it is desired to propel the lift truck 10 in the forward direction, the operator operates the foot pedal 12 activating the forward switch 42 which produces a low output causing capacitor 94 to discharge and causing the voltage applied to inverter 96 to fall. The output of inverter 96 goes high and the output inverter 98 goes low while the output of inverter 102 is low and the output of inverter 104 is high.

The inputs of NAND gate 106 are one high and one low yielding a high output and the inputs of NAND gate 108 are one low and one high yielding a high output which result in the flip-flop 113 not triggering OR gate 114 and not neutralizing the system.

Referring to FIG. 3, the low output of inverter 98 sets flip-flop 62 triggering OR gate 152 and allows the forward counter 56 to count. The forward coil 26 is energized and the lamp 30 is lighted after the brief time delay. The flip-flop 62 triggers NOR gate 126 which resets flip-flop 64 which resets counter 58 to zero turning off reverse coil 28.

It the operator removes his foot from the foot pedal 12, the pedal returns to a preselected position, preferably neutral, but the flip-flop 62 remains set and the counter 56 latches after 12 counts keeping forward coil 26 energized. The inverters 96 and 98 and the capacitor 94 return to the neutral state. Further activation of the forward switch 42 will activate the capacitor 94 and inverters 96 and 98, but has no effect on flip-flop 62.

If it is now desired to propel the lift truck 10 in the reverse direction, the operator operates the reverse switch 44 which sets flip-flop 64 and resets flip-flop 62 and resets forward counter 56 to zero. Flip-flop 64 triggers OR gate 154 which allows the reverse counter 58 to count. The 120 ms delay provided by reverse counter 58 allows the forward coil 26 time to deenergize before coil 28 is energized.

In the event that both switches 42 and 44 are activated at the same time, flip-flop 113 goes high triggering OR gate 114 which triggers NOR gates 120 and 126 which reset both flip-flops 62 and 64 so that the lift truck is in neutral. Both switches 42 and 44 must be deactivated and only one reactivated before the lift truck 10 can travel in either direction.

Zener diode 176 protects the output transistors 194,198,206 against voltage spikes in excess of about 100 volts when the transistors are off. A current path is provided through resistor 178. Zener diode 188 similarly protects the reverse transistors 196,200 and 212.

Referring to FIG. 2, in another aspect of the invention, the lift truck 10 is an electric lift truck which has an 18 to 50 Vdc battery connected to point 22 of the circuit 34 and the coils 26 and 30 are relay coils. In this application diodes 78 and 80 are nonfunctional but diode 76 is functional. Power flows from the lift truck battery through resistors 70 and 72 and zener diode 82. Resistor 70 serves as a dropping resistor to make the battery voltage compatible with the remainder of the circuit connected to the junction of resistors 70 and 72. The remainder of the circuit 34 operates in the manner as previously described.

Referring to FIG. 2, the neutralizing means 66 can be disconnected where it is desired to change direction by merely operating the selected switch 42 or 44. This is accomplished by removing gates 106,108,110,112 and 114 from the circuit and connecting one input of NOR gates 120 and 126 to the junction of resistor 116 and capacitor 118. By this construction operation of switch 42 sets flip-flop 62 and allows the forward counter 56 to count. Subsequent operation of switch 44 sets flip-flop 64 allowing the reverse counter 58 to count and resets flip-flop 62 which resets counter 56 to zero.

Other aspects, objects and advantages will become apparent from a study of the specification, drawings and appended claims.

What is claimed is:

1. In a vehicle (10) having a forward switch (42) controllably energizing a forward solenoid (26) for propelling the vehicle (10) in the forward direction and a reverse switch (44) controllably energizing a reverse solenoid (28) for propelling the vehicle (10) in the reverse direction, the improvement comprising:

first means (38), for controllably energizing one of the forward and reverse solenoids (26,28) in response to receiving a command signal;

second means (40), for delaying operation of one of the forward and reverse solenoids (26,28) a preselected time sufficient for the other of the forward and reverse solenoids (26,28) to deenergize;

third means (60), for storing the command signal and energizing the second means (40) in response to receiving the command signal; and neutralizing means (66) for detecting the activation of both the forward and reverse switches (42,44) and preventing the operation of either of the forward and reverse solenoids (26,28) and maintaining the vehicle (10) in a neutral condition.

2. A vehicle, (10) as set forth in claim 1, including means (170,182) for connecting the second means (40) to the first means (38) and delivering the command signal to the first means (38).

3. A vehicle (10), as set forth in claim 1, including detecting means (68) for detecting a preselected abnormal circuit condition, enabling the second means (40) and immediately deenergizing the first meand (38) and preventing operation of the solenoids (26,28) during the abnormal circuit condition.

4. An electronic directional control circuit (34), comprising:

input means (36) for producing first and second command signals;

output means (38) for producing a first output of preselected polarity and magnitude in response to the input means (36) producing the first command signal and producing a second output of preselected magnitude and polarity in response to the input means (36) producing the second command signal;

delay means (40) for delaying operation of the output means (38) and production of the first and second outputs a preselected time sufficient for the first output to decrease to a preselected magnitude prior to the production of the second output and for the second output to decrease to a preselected magnitude prior to the production of the first output; and neutralizing means (66) for receiving the first and second command signals and preventing operation of the output means (38) and production of the first and second outputs in response to receiving both the first and second command signals, said neutralizing means (66) thereafter preventing operation of the output means (38) until both the command signals disappear and only one of the command signals reappears.

5. An electronic directional control circuit (34), comprising:

input means (36) for producing first and second command signals;

output means (38) for producing a first output of preselected polarity and magnitude in response to the input means (36) producing the first command signal and producing a second output of preselected magnitude and polarity in response to the input means (36) producing the second command signal;

delay means (40) for delaying operation of the output means (38) and production of the first and second outputs a preselected time sufficient for the first ouput to decrease to a preselected magnitude prior to the production of the second output and for the second output to decrease to a preselected magnitude prior to the production of the first output; and detecting means (68) for detecting the magnitude of the first and second outputs and immediately preventing operation of the output means (38) when the magnitude of either of the first and second outputs exceeds a preselected value.

6. An electronic circuit (34), as set forth in claim 5, wherein the detecting means (68) is connected to the delay means (40) and wherein the delay means (40) prevents operation of the output means (38) and production of the first and second outputs for a preselected time interval measured from the moment the magnitude first exceeds the preselected value and at equal time intervals thereafter so long as the magnitude exceeds the preselected value.

7. An electronic circuit (34), as set forth in claim 4, including means (60) for receiving the first and second command signals and storing a selected one of the signals.

8. An electronic directional control circuit (34), comprising:

input means (36) for producing first and second command signals;

output means (38) for producing a first output of preselected polarity and magnitude in response to the input means (36) producing the first command signal and producing a second output of preselected magnitude and polarity in response to the input means (36) producing the second command signal;

delay means (40) for delaying operation of the output means (38) and production of the first and second outputs a preselected time sufficient for the first output to decrease to a preselected magnitude prior to the production of the second output and for the second output to decrease to a preselected magnitude prior to the production of the first output;

a Hall effect switch (42,44); and a pulse shaper (96-98,102-104) connected to the switch (42,44), said pule shaper (96-98,102-104) being adapted to receive a slow rising signal from the switch (42,44) and delivering a fast rising signal in response to receiving the slow rising signal.

9. An electronic circuit (34), as set forth in claim 8, including means (60) for receiving the first and second command signals and storing a selected one of the signals.

* * * * *